US009606756B2

(12) United States Patent
Oka

(10) Patent No.: US 9,606,756 B2
(45) Date of Patent: Mar. 28, 2017

(54) PRINTING APPARATUS AND CONTROL METHOD

(71) Applicant: Seiko Instruments Inc., Chiba-shi, Chiba (JP)

(72) Inventor: Ryuichi Oka, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 0 days.

(21) Appl. No.: 14/989,254

(22) Filed: Jan. 6, 2016

(65) Prior Publication Data

US 2016/0210085 A1    Jul. 21, 2016

(30) Foreign Application Priority Data

Jan. 19, 2015    (JP) .................................. 2015-008113

(51) Int. Cl.
*G06F 15/00*    (2006.01)
*G06F 3/12*    (2006.01)
(Continued)

(52) U.S. Cl.
CPC .............. *G06F 3/122* (2013.01); *G06F 3/121* (2013.01); *G06F 3/1236* (2013.01);
(Continued)

(58) Field of Classification Search
CPC combination set(s) only.
See application file for complete search history.

(56) References Cited

U.S. PATENT DOCUMENTS

| 2001/0040691 A1* | 11/2001 | Sakamoto | G06K 15/00 358/1.14 |
| 2009/0207438 A1* | 8/2009 | Fujita | G06F 3/1204 358/1.15 |

(Continued)

FOREIGN PATENT DOCUMENTS

JP    2003-266813 A    9/2003

*Primary Examiner* — Helen Q Zong
(74) *Attorney, Agent, or Firm* — Brinks Gilson & Lione

(57) ABSTRACT

A printing unit comprises: a communication unit configured to be connected to a communication line to which a plurality of print data transmission devices are connectable; a memory unit configured to store print data received by the communication unit; a printing unit including a roller mechanism for sending recording paper and being configured to drive a printing mechanism based on the print data stored in the memory unit to print on the recording paper; and a control unit configured to determine, in response to receiving a connection request from a first print data transmission device by the communication unit, whether or not the printing apparatus is connected to another print data transmission device for communication, cause the communication unit to send as a reply a first response for causing the first print data transmission device to wait to start transmission of print data when the printing apparatus is connected to the another print data transmission device for communication, and cause the communication unit to send as a reply a second response for allowing the first print data transmission device to transmit the print data after the printing apparatus and the another print data transmission device end the communication connection.

5 Claims, 5 Drawing Sheets

(51) Int. Cl.
*G06K 15/02* (2006.01)
*G06K 15/00* (2006.01)
(52) U.S. Cl.
CPC ......... *G06F 3/1284* (2013.01); *G06K 15/022* (2013.01); *G06K 15/028* (2013.01); *G06K 15/1817* (2013.01); *G06K 15/1821* (2013.01); *G06K 15/402* (2013.01)

(56) References Cited

U.S. PATENT DOCUMENTS

| | | | | |
|---|---|---|---|---|
| 2011/0194147 A1* | 8/2011 | Kato | ............... | B41J 29/393 358/1.15 |
| 2012/0148323 A1* | 6/2012 | Shimada | ............... | G06F 3/1204 400/76 |
| 2012/0242772 A1* | 9/2012 | Jimbo | ............... | B41J 25/312 347/197 |
| 2012/0293835 A1* | 11/2012 | Amano | ............... | G06F 3/121 358/1.15 |

* cited by examiner

FIG.2

| SOURCE PORT NUMBER | DESTINATION PORT NUMBER |
|---|---|
| SEQUENCE NUMBER ||
| ACK NUMBER ||
| DATA OFFSET | RESERVED | FLAG | WINDOW SIZE |
| HEADER CHECKSUM | URGENT POINTER |

PRINTING APPARATUS AND CONTROL METHOD

RELATED APPLICATIONS

This application claims priority under 35 U.S.C. §119 to Japanese Patent Application No. 2015-008113 filed on Jan. 19, 2015, the entire content of which is hereby incorporated by reference.

BACKGROUND OF THE INVENTION

1. Field of the Invention

The present invention relates to a printing apparatus and a control method for the same.

2. Description of the Related Art

Hitherto, a thermal printer has been known as a printer configured to print on a recording sheet (thermal paper). The thermal printer includes a printing unit that can be reduced in size and weight, and has a simple configuration without using toner or ink. Therefore, the thermal printer is employed for, for example, cash registers or mobile terminal devices to be widely used to print various labels, receipts, and tickets.

As the thermal printer, there is given one configured to print on rolled paper. In such thermal printer, print data is continuously input to be printed in order of the input. When the input of print data is interrupted in the thermal printer, the print data, which does not reach the end, remains stored in a memory. Under this remained state, when new print data is input to the thermal printer, the new print data is stored sequentially to the interrupted print data. As a result, there is a fear in that the thermal printer may print the interrupted print data and the new print data in an incorporated manner, and may cause data corruption in print (phenomenon in which print data is not correctly displayed). To address this problem, when the input of print data is interrupted, the thermal printer deletes the print data stored in the memory and then prints normally the new print data.

It is necessary to detect a data section such as a beginning of a print job in order to delete the interrupted print data from the memory in the thermal printer. For example, as a technology of this type, there has been hitherto known a method involving detecting a data section by analyzing a command contained in print data.

However, it is sometimes not possible to detect an appropriate data section even when the command of print data is analyzed as in the related art. For example, there is no concept of "page" when printing is performed on rolled paper as in the above-mentioned thermal printer. Therefore, the data section may not be detected by simply analyzing the print data, and thus the interrupted print data may not be deleted.

Further, in some cases, a plurality of hosts are connected to the thermal printer via a LAN line and print data is transmitted from those plurality of hosts. In this case, when print data in the memory is deleted in bulk based on provision of a print interruption request by a particular host, print data that has been transmitted from another host may be deleted as well. When a part of the print data that has been transmitted from another host is deleted, the printing cannot be performed normally as a result, which means that bulk deletion in the memory is problematic.

Further, in a case where the thermal printer is connected to the LAN line, when a host has transmitted print data and then another host also transmits print data during the printing of the print data of the original host, printing for another host is put into a waiting state. In this state, the print data transmitted from another host is temporarily stored in the memory. However, when the printing for the original host is interrupted and transmission of print data of another host is also interrupted, the interrupted print data remains in the memory, resulting in a fear of causing data corruption in print.

In view of the points described above, in this technical field, there are desired a printing apparatus and a control method capable of preventing the data corruption in print even when the print data is transmitted from the plurality of data transmission sources.

SUMMARY OF THE INVENTION

A printing apparatus according to one embodiment of the present invention comprises: a communication unit configured to be connected to a communication line to which a plurality of print data transmission devices are connectable; a memory unit configured to store print data received by the communication unit; a printing unit including a roller mechanism for sending recording paper and being configured to drive a printing mechanism based on the print data stored in the memory unit to print on the recording paper; and a control unit configured to determine, in response to receiving a connection request from a first print data transmission device by the communication unit, whether or not the printing apparatus is connected to another print data transmission device for communication, cause the communication unit to send as a reply a first response for causing the first print data transmission device to wait to start transmission of print data when the printing apparatus is connected to the another print data transmission device for communication, and cause the communication unit to send as a reply a second response for allowing the first print data transmission device to transmit the print data after the printing apparatus and the another print data transmission device end the communication connection.

Further, in the printing apparatus according to the one embodiment of the present invention: the first response includes information indicating that there is no capacity available for storing print data in the memory unit; and the second response includes information indicating a data capacity that is capable of being stored in the memory unit.

Further, in the printing apparatus according to the one embodiment of the present invention, the control unit is configured to delete print data stored in the memory unit in bulk when the communication connection between the printing apparatus and the another print data transmission device is interrupted, and transmit the second response to the first print data transmission device.

Further, in the printing apparatus according to the one embodiment of the present invention: the recording paper is rolled to form rolled paper having a hollow hole; and the printing unit is configured to print on a part of the recording paper that is drawn from the rolled paper by the roller mechanism.

Further, according to one embodiment of the present invention, there is provided a control method for a printing apparatus, the printing apparatus including: a communication unit configured to be connected to a communication line to which a plurality of print data transmission devices are connectable; a memory unit configured to store print data received by the communication unit; and a printing unit including a roller mechanism for sending recording paper and being configured to drive a printing mechanism based on the print data stored in the memory unit to print on the recording paper, the control method including: determining, in response to receiving a connection request from a first print data transmission device by the communication unit, whether or not the printing apparatus is connected to another print data transmission device for communication; sending as a reply a first response for causing the first print data transmission device to wait to start transmission of print data when the printing apparatus is connected to the another print data transmission device for communication; and sending as a reply a second response for allowing the first print data transmission device to transmit the print data after the printing apparatus and the another print data transmission device end the communication connection.

BRIEF DESCRIPTION OF THE DRAWINGS

FIG. 2 is a diagram for illustrating a part of a control packet exchanged between a communication terminal and a printing apparatus in the printing system to which the present invention is applied.

DETAILED DESCRIPTION OF THE PREFERRED EMBODIMENTS

Figure 1:
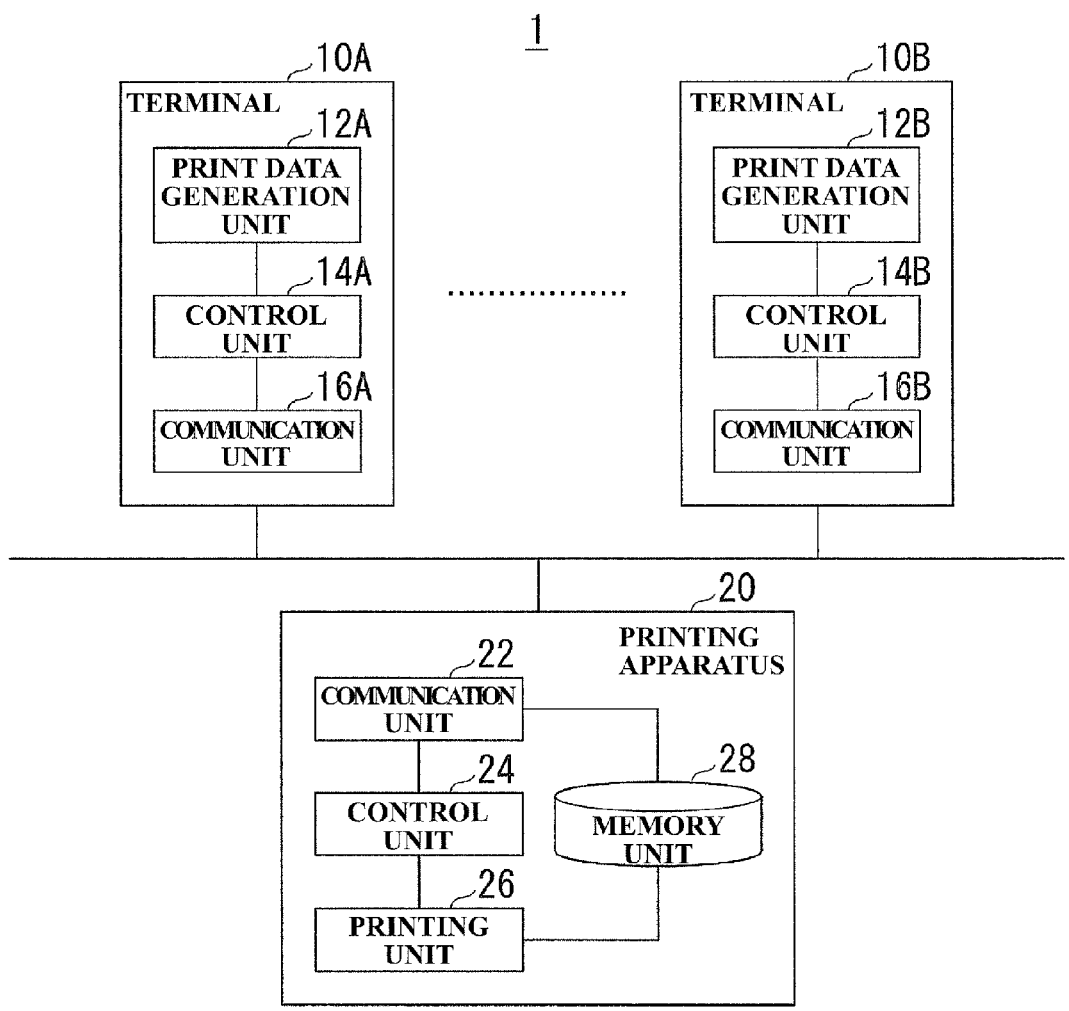
FIG. 1 is a block diagram for illustrating a system configuration of a printing system to which the present invention is applied.

Now, a printing system 1 of an embodiment of the present invention is described in detail. FIG. 1 is a block diagram for illustrating a system configuration of the printing system 1 of this embodiment.

The printing system 1 includes a plurality of terminals 10A to 10B and a printing apparatus 20. The plurality of terminals 10A to 10B and the printing apparatus 20 are each connected to a local area network (LAN) line, and transmit and receive a control packet (request, response) and at the same time transmit and receive data to/from one another via the LAN line.

A communication terminal 10 is a computer including an operation interface, a communication interface, a calculation circuit, a control circuit, and a storage device. The communication terminals 10A and 10B respectively include print data generation units 12A and 12B, control units 14A and 14B, and communication units 16A and 16B. Note that, the communication terminals 10A and 10B, the print data generation units 12A and 12B, the control units 14A and 14B, and the communication units 16A and 16B are collectively and simply referred to as a communication terminal 10, a print data generation unit 12, a control unit 14, and a communication unit 16, respectively.

The print data generation unit 12 is realized by implementing application software and the like on the communication terminal 10. Note that, any application software may be employed as software for generating print data. The print data generation unit 12 generates print data to be transmitted to the printing apparatus 20. The print data generation unit 12 provides the control unit 14 with the print data in response to generation of a print command by application software.

The control unit 14 is a software function unit that functions by a processor such as a central processing unit (CPU) executing a program stored in a memory (not shown). Further, the control unit 14 may be a hardware function unit such as a large scale integration (LSI) or an application specific integrated circuit (ASIC). The control unit 14 performs control such that the printing apparatus 20 prints the print data provided from the print data generation unit 12.

The communication unit 16 provides a signal through the LAN line in accordance with control by the control unit 14 and detects a signal provided through the LAN line.

The printing apparatus 20 is realized by a printing mechanism, a communication interface, a control circuit, and a storage device. The printing apparatus 20 includes a communication unit 22, a control unit 24, a printing unit 26, and a memory unit 28.

The communication unit 22 is connected to the LAN line. With this, the communication unit 22 is communicatively connected to the plurality of communication terminals 10 (print data transmission devices). The memory unit 28 functions as a communication buffer for temporarily storing print data received by the communication unit 22. The memory unit 28 sequentially stores print data received by the communication unit 22. Further, the print data stored in the memory unit 28 is deleted sequentially when the print data becomes unnecessary for printing. Note that, the capacity of the memory unit 28 is defined in a design stage of the printing apparatus 20, and is small in this embodiment for simplicity of the configuration.

The printing unit 26 is a thermal printer mechanism for printing by pressing a thermal head on recording paper (thermal paper), which produces color with addition of heat. Further, the printing unit 26 includes a roller mechanism for sending recording paper. This recording paper is thermal paper, and is suitably used to print, for example, various labels, receipts, and tickets. This recording paper is rolled to form rolled paper having a hollow hole. Then, the printing unit 26 prints on a part of recording paper P that is drawn from the rolled paper by the roller mechanism. At this time, the printing unit 26 drives the printing mechanism based on print data sequentially stored into the memory unit 28 in accordance with control by the control unit 24, to thereby print on the recording paper sequentially. This type of printing apparatus 20 sequentially stores print data into the memory unit 28 in response to sequential provision of print data by the communication terminal 10, sequentially prints, and sequentially deletes the print data from the memory unit 28. In other words, the printing apparatus 20 does not assume a data section such as a page, and repeatedly performs data reception, data storage, printing, and data deletion.

The control unit 24 is a software function unit that functions by a processor such as a central processing unit (CPU) executing a program stored in a memory unit (not shown). Further, the control unit 24 may be a hardware function unit such as a large scale integration (LSI) or an application specific integrated circuit (ASIC). The control unit 24 controls communication by the communication unit 22 and controls printing by the printing unit 26.

FIG. 2 is a diagram for illustrating a part of a control packet exchanged between the communication terminal 10 and the printing apparatus 20 in the printing system 1 to which the present invention is applied. The control packet includes a Transmission Control Protocol (TCP) header. The TCP header includes a source port number field, a destination port number field, a sequence number field, an ACK number field, a data offset field, a reserved field, a flag field, a window size field, a header checksum field, and an urgent pointer field. The source port number field stores a port number used by a signal transmission source. The destination port number field stores a port number used by a signal transmission destination. The sequence number field stores the number of the first byte of print data to be transmitted.

The window size field stores a buffer size of data that can be received by a data reception side. In other words, the window size field stores the size of data that can be received by the printing apparatus 20 at one time. The window size field usually stores a free capacity of the memory unit 28. However, the printing apparatus 20 of this embodiment controls the value to be stored in the window size field by performing particular processing described below.

Figure 3:
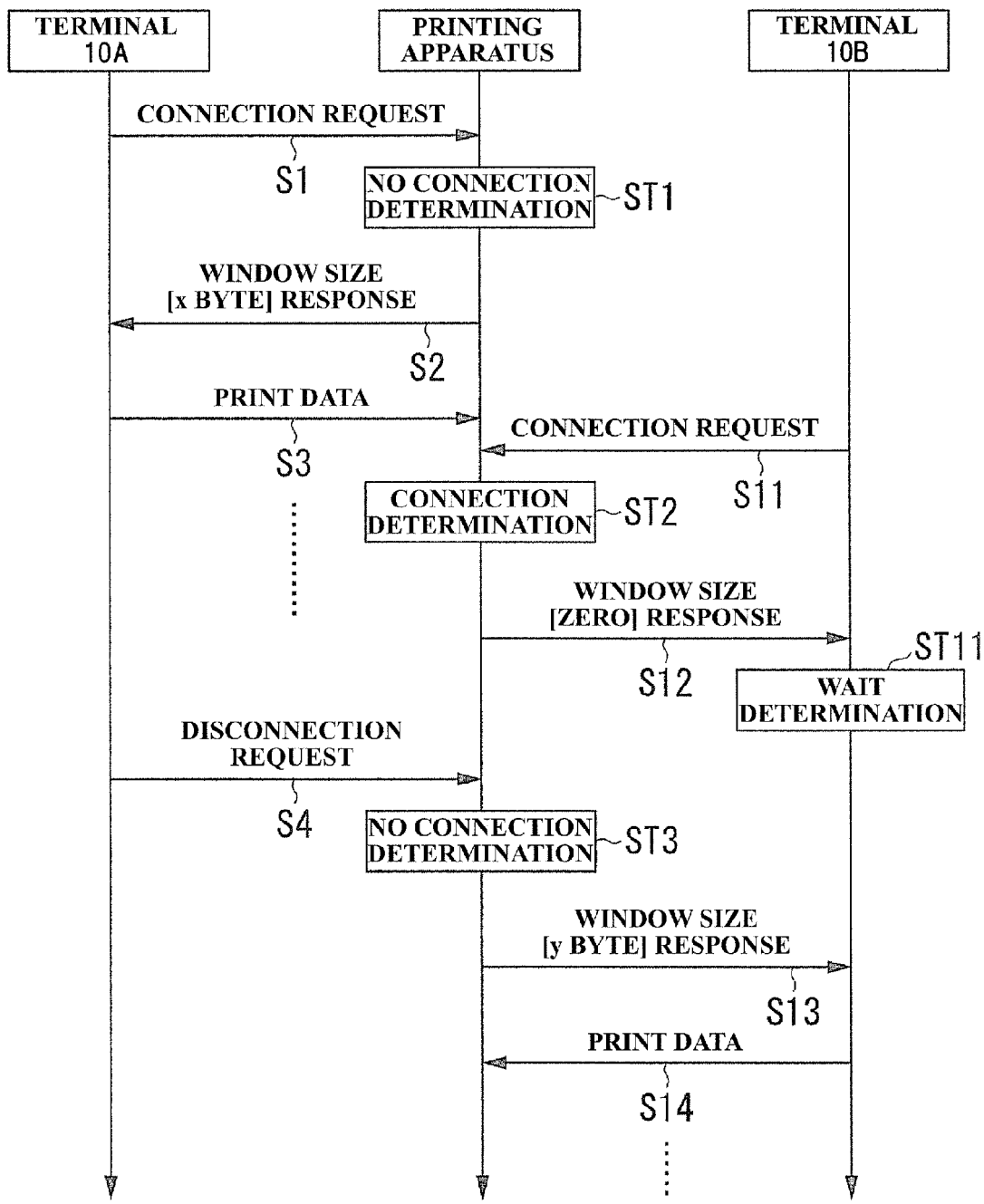
FIG. 3 is a sequence diagram for illustrating an operation procedure in the printing system to which the present invention is applied.

Now, a description is given of a processing procedure when the plurality of communication terminals 10 request a connection to the printing apparatus 20 in the printing system 1 described above. FIG. 3 is a sequence diagram for illustrating an operation procedure in the printing system 1 to which the present invention is applied. Note that, the communication processing between the communication terminal 10 and the printing apparatus 20 described below is executed in accordance with the TCP protocol.

First, the communication terminal 10A transmits a connection request S1 to the printing apparatus 20. In response to receiving the connection request S1, the printing apparatus 20 determines, by the control unit 24, whether or not the printing apparatus 20 has already started a connection (communication connection) to another communication terminal 10. The communication terminal 10B has not transmitted a connection request to the printing apparatus 20, and thus the printing apparatus 20 determines that the printing apparatus 20 has not started a connection to another communication terminal 10 (Step ST1). Then, the printing apparatus 20 transmits a window size response S2 as a control packet including the TCP header to the communication terminal 10A that has transmitted the connection request S1. At this time, the control unit 24 confirms the actual free capacity of the memory unit 28 and stores the buffer size (x byte), which is the free capacity, into the window size field.

The communication terminal 10A recognizes that x-byte print data can be transmitted by receiving the window size response S2 transmitted from the printing apparatus 20. The communication terminal 10A transmits x-byte print data S3 by dividing the print data for transmission into pieces of data each having a predetermined number of bytes. This print data S3 is received by the printing apparatus 20. In this manner, the printing apparatus 20 sequentially receives and stores the print data to start printing.

Now, it is assumed that after the printing apparatus 20 receives the connection request S1 from the communication terminal 10A, the communication terminal 10B transmits a connection request S11. The printing apparatus 20 determines, by the control unit 24, whether or not the printing apparatus 20 has already started a connection to another communication terminal 10. The printing apparatus 20 has established a connection to the communication terminal 10A, and thus determines that the printing apparatus 20 has already started a connection to another communication terminal 10 (Step ST2). The printing apparatus 20 transmits a window size response S12 as a control packet including the TCP header to the communication terminal 10B that has transmitted the connection request S11. At this time, the control unit 24 stores the buffer size of zero into the window size field irrespective of the actual free capacity of the memory unit 28. This window size response S12 corresponds to a first response for causing the communication terminal 10B to wait to start transmission of print data.

The communication terminal 10B recognizes that print data cannot be transmitted by receiving the window size response S12 transmitted from the printing apparatus 20. The communication terminal 10B is put into a state in which the communication terminal 10B waits to transmit print data until another window size response is transmitted thereafter (Step ST11).

After that, the communication terminal 10A transmits a disconnection request S4 to the printing apparatus 20. The communication terminal 10A transmits the disconnection request S4 based on, for example, the fact that transmission of print data is finished or transmission of print data is interrupted.

The printing apparatus 20 ends the printing in accordance with the print data stored in the memory unit 28 in response to receiving the disconnection request S4 from the communication terminal 10A. Further, the printing apparatus 20 determines that the printing apparatus 20 has no connection to another communication terminal 10 in response to receiving the disconnection request S4 (Step ST3). Then, the printing apparatus 20 stores the actual free capacity of the memory unit 28 as a buffer size (y byte) into the window size field, and transmits a window size response S13 to the communication terminal 10B. This window size response S13 corresponds to a second response for allowing the communication terminal 10B to transmit print data.

The communication terminal 10B recognizes that the communication terminal 10B is allowed to transmit y-byte print data by receiving the window size response S13 transmitted from the printing apparatus 20. The communication terminal 10B transmits y-byte print data S14 by dividing the print data for transmission into pieces of data each having a predetermined number of bytes. This print data S14 is received by the printing apparatus 20. In this manner, the printing apparatus 20 sequentially receives and stores the print data to start printing.

Figure 4:
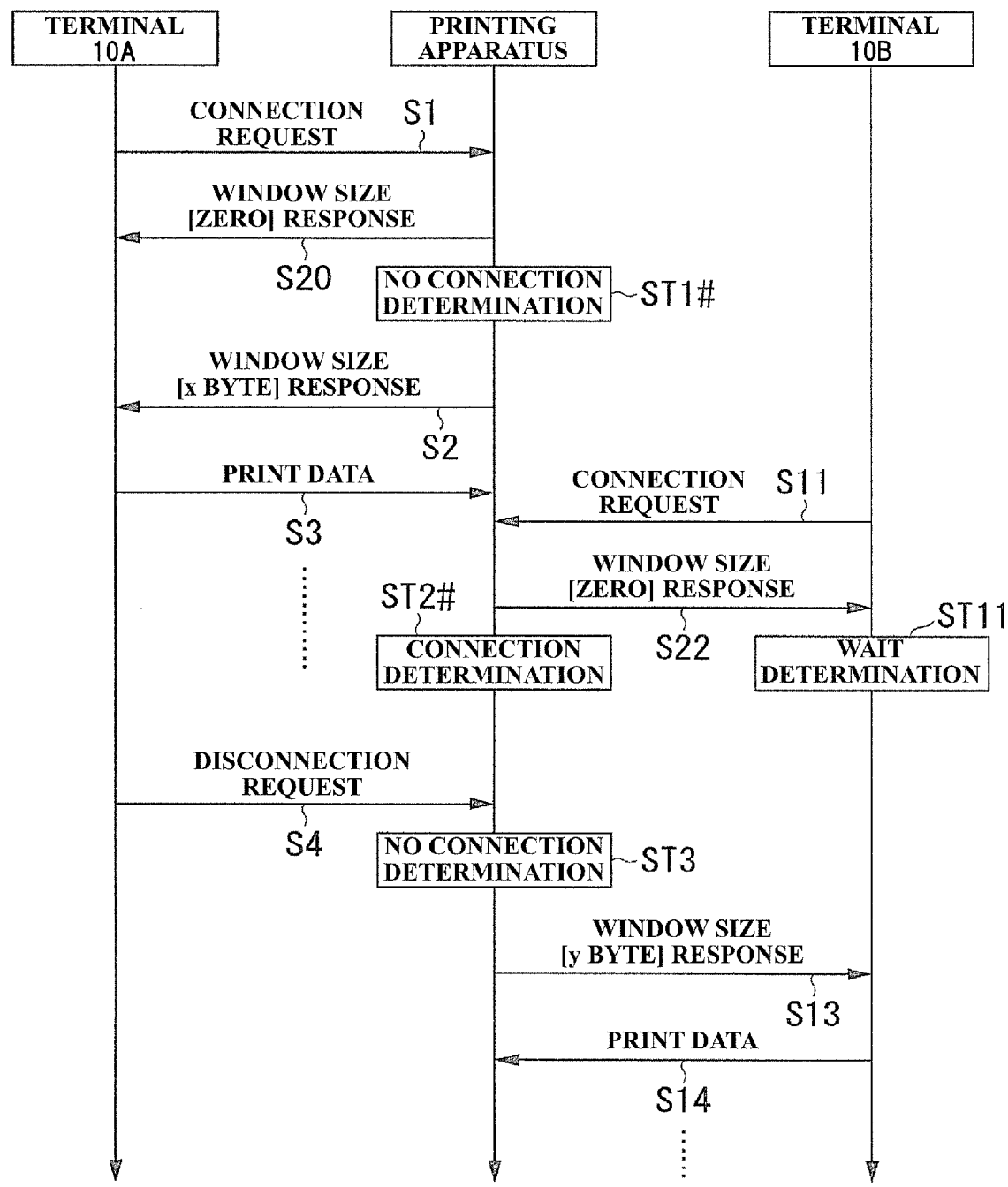
FIG. 4 is a sequence diagram for illustrating an operation procedure in the printing system to which the present invention is applied.

Now, a description is given of another processing procedure when the plurality of communication terminals 10 request a connection to the printing apparatus 20 in the printing system 1 described above. FIG. 4 is a sequence diagram for illustrating an operation procedure in the printing system 1 to which the present invention is applied.

The printing apparatus 20 sends as a reply window size responses S20 and S22 whose window size fields store the buffer size of zero in response to receiving the connection requests S1 and S11 from the communication terminals 10. After that, the printing apparatus 20 determines whether or not the printing apparatus 20 has already started a connection to another communication terminal 10 (Steps ST1# and ST2#).

When the printing apparatus 20 receives the connection request S1 from the communication terminal 10A, the printing apparatus 20 has not started a connection to the communication terminal 10B. Thus, the printing apparatus 20 determines that the printing apparatus 20 has not started a connection yet (Step ST1#). Further, when the printing apparatus 20 receives the connection request S11 from the communication terminal 10B, the printing apparatus 20 determines that the printing apparatus 20 has started a connection to the communication terminal 10A (Step ST2#).

As described above, the printing system 1 of this embodiment is configured such that the printing apparatus 20 determines, in response to receiving a connection request from the communication terminal 10, whether or not the printing apparatus 20 is connected to another communication terminal 10 for communication, and when the printing apparatus 20 is connected to another communication terminal 10 for communication, the printing apparatus 20 sends as a reply a response (first response) whose window size field stores zero to cause the communication terminal 10 to wait to start transmission of print data. After that, the printing apparatus 20 sends as a reply a response (second response) including the actual free capacity for allowing the communication terminal 10 to transmit print data after the printing apparatus 20 ends the communication connection to another communication terminal 10. With this, the printing apparatus 20 is capable of receiving print data from the single communication terminal 10 and causing another communication terminal 10 to wait even when the plurality of data transmission sources (communication terminals 10) transmit print data. As a result, the printing apparatus 20 enables prevention of the data corruption in print without mixing up print data transmitted from the plurality of communication terminals 10.

Further, in the printing system 1 of this embodiment, the first response includes information indicating that there is no capacity available for storing print data in the memory unit 28, and the second response includes information indicating the data capacity that can be stored in the memory unit 28. With this, the printing apparatus 20 can cause the communication terminal 10B to wait to start transmission of print data using the existing TCP protocol, to thereby realize the above-mentioned effect easily without adding a new component.

Further, the printing system 1 can prevent transmission of print data by the communication terminal 10B when there is a connection between the printing apparatus 20 and the communication terminal 10A by using the TCP protocol without changing the application software. With this, the printing system 1 can prevent overhead before the print data starts to be transmitted from becoming larger because the communication terminal 10 does not need to confirm the print waiting state of the printing apparatus 20 through processing on, for example, an application layer.

Further, the printing system 1 may delete the print data stored in the memory unit 28 in bulk when the disconnection request S4 is received from the communication terminal 10A and the communication connection between the communication terminal 10A and the printing apparatus 20 is interrupted. Then, the printing apparatus 20 transmits the window size response S13 including the actual free capacity of the memory unit 28 to the communication terminal 10B. The printing system 1 does not allow the communication terminal 10B to transmit print data when the communication terminal 10A is connected to the printing apparatus 20 for communication. Thus, the printing system 1 can delete the print data stored in the memory unit 28 in bulk, to thereby enable prevention of the data corruption in print without mixing up print data of the communication terminal 10A with that of the communication terminal 10B.

Figure 5:
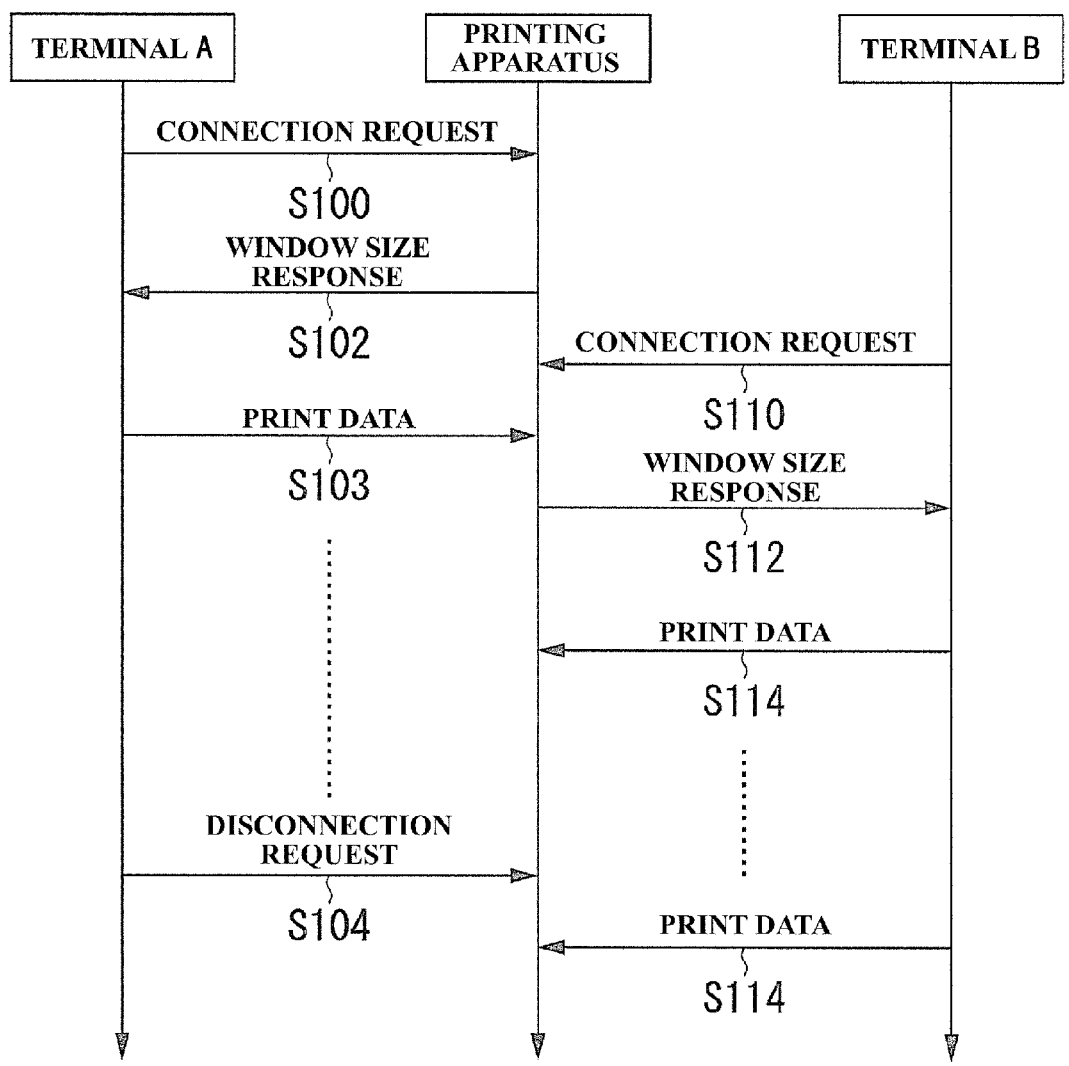
FIG. 5 is a sequence diagram for illustrating an operation of a printing system according to a comparative example of the present invention.

FIG. 5 is a sequence diagram for illustrating an operation of a printing system according to a comparative example of the present invention. In the printing system according to the comparative example, the printing apparatus sends as a reply window size responses S102 and S112 including the actual free capacity of the buffer to communication terminals A and B respectively when the communication terminals A and B transmit connection requests S100 and S110. Then, since the printing apparatus 20 starts to receive print data S114, the printing apparatus 20 is put into a state in which the printing apparatus 20 receives print data S103 from the communication terminal A and the print data S114 from the communication terminal B. After that, when the printing apparatus 20 receives a disconnection request S104 from the communication terminal A, the print data S103 and the print data S114 are mixed up in the buffer, leading to a cause of the data corruption in print. In contrast, the printing system 1 of this embodiment does not receive print data from the plurality of communication terminals at the same time, and hence the data corruption in print can be prevented.

The function of the printing apparatus 20 in the above-mentioned embodiment may be realized by a computer. In that case, this function may be realized by recording a program for realizing this function in a computer-readable recording medium and causing a computer system to read and execute the program stored in this recording medium. Note that, the "computer system" as used herein includes an OS and hardware such as peripheral devices. Further, the "computer-readable recording medium" refers to a portable medium such as a flexible disk, a magneto-optical disk, a ROM, and a CD-ROM or a storage device such as a hard disk built in the computer system. Further, the "computer-readable recording medium" may include an entity for dynamically holding a program for a short period of time such as a communication wire through which the program is transmitted via a network such as the Internet or a communication line such as a phone line, and also include an entity for holding a program for a certain period of time such as a volatile memory inside the computer system serving as a server or a client in that case. Further, the program may realize a part of the above-mentioned function, or may realize the above-mentioned function in combination with programs already recorded in the computer system.

Certain embodiments of the present invention have been described. However, those embodiments are presented as examples and are not intended to limit the scope of the invention. Those embodiments may be implemented in other various modes, and various kinds of omissions, replacements, and modifications can be made without departing from the gist of the invention. Those embodiments and variations thereof are included in the scopes of the invention described in the appended claims and their equivalents in the same way as those are included in the scope and gist of the invention.

The above-mentioned embodiment describes a case in which the first response for causing the communication terminal to wait to start transmission of print data is a window size response including the zero free capacity, but another command may be used as long as the command includes information for causing the communication terminal to wait to start transmission of print data. For example, a command for causing the communication terminal to wait to start transmission of print data may be set to be stored into the option field of the TCP header, and the printing apparatus 20 and the communication terminal 10 may recognize this command.

Further, the above-mentioned embodiment describes a case in which the second response for allowing the communication terminal to transmit print data is a window size response including the actual free capacity, but another command may be used as long as the command includes information for allowing the communication terminal to transmit print data. For example, a command for allowing the communication terminal to transmit print data may be set to be stored into the option field of the TCP header, and the printing apparatus 20 and the communication terminal 10 may recognize this command.

Further, the communication terminal 10 and the printing apparatus 20 may exchange information with each other to cause the communication terminal to wait to start transmission of print data by using a protocol other than the TCP protocol.

What is claimed is:

1. A printing apparatus, comprising:
   a communication unit configured to be connected to a communication line to which a plurality of print data transmission devices are connectable;
   a memory configured to store print data received by the communication unit;
   a printing device including a roller mechanism for sending recording paper and configured to drive a printing mechanism based on the print data stored in the memory unit to print on the recording paper; and
   a controller configured to determine, in response to receiving a connection request from a first print data transmission device by the communication unit,
      whether or not the printing apparatus is connected to another print data transmission device for communication,
      cause the communication unit to send as a reply a first response for causing the first print data transmission device to wait to start transmission of the print data when the printing apparatus is connected to the another print data transmission device, and
      cause the communication unit to send as a reply a second response for allowing the first print data transmission device to transmit the print data after the printing apparatus and the another print data transmission device end the communication connection.

2. A printing apparatus according to claim 1, wherein the first response includes
   information indicating that there is no capacity available for storing the print data in the memory; and
   the second response includes information indicating a data capacity that is capable of storing the print data in the memory.

3. A printing apparatus according to claim 1, wherein the controller is configured to delete other print data stored in the memory in bulk when the communication connection between the printing apparatus and the another print data transmission device is interrupted, and transmit the second response to the first print data transmission device.

4. A printing apparatus according to claim 1, wherein the recording paper is rolled to form rolled paper having a hollow hole; and
   the printing device is configured to print on a part of the recording paper that is drawn from the rolled paper by the roller mechanism.

5. A control method for a printing apparatus, the printing apparatus including:
   a communication unit configured to be connected to a communication line to which a plurality of print data transmission devices are connectable;
   a memory configured to store print data received by the communication unit; and a printing device including a roller mechanism for sending recording paper and configured to drive a printing mechanism based on the print data stored in the memory unit and to print on the recording paper,
   the control method including:
   determining, in response to receiving a connection request from a first print data transmission device by the communication unit, whether or not the printing apparatus is connected to another print data transmission device for communication;
   sending as a reply a first response for causing the first print data transmission device to wait to start transmission of print data when the printing apparatus is connected to the another print data transmission device for communication; and
   sending as a reply a second response for allowing the first print data transmission device to transmit the print data after the printing apparatus and the another print data transmission device end the communication connection.

* * * * *